United States Patent
Nakamura et al.

(10) Patent No.: US 8,112,786 B2
(45) Date of Patent: *Feb. 7, 2012

(54) SECURITY POLICY GENERATION

(75) Inventors: Yuhichi Nakamura, Kanagawa-ken (JP); Takeshi Imamura, Kanagawa-ken (JP); Michiaki Tatsubori, Kanagawa-ken (JP); Satoshi Makino, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 391 days.

This patent is subject to a terminal disclaimer.

(21) Appl. No.: 12/251,313

(22) Filed: Oct. 14, 2008

(65) Prior Publication Data

US 2009/0044248 A1 Feb. 12, 2009

Related U.S. Application Data

(63) Continuation of application No. 11/158,622, filed on Jun. 21, 2005, now abandoned.

(30) Foreign Application Priority Data

Jun. 22, 2004 (JP) .................................. 2004-184035

(51) Int. Cl.
*G06F 17/00* (2006.01)
*H04L 9/32* (2006.01)

(52) U.S. Cl. ............................. 726/1; 713/176; 713/193

(58) Field of Classification Search ................ 726/1, 26, 726/27

See application file for complete search history.

(56) References Cited

U.S. PATENT DOCUMENTS

| | | |
|---|---|---|
| 6,091,835 A | 7/2000 | Smities et al. |
| 6,738,908 B1 | 5/2004 | Bonn et al. |
| 6,918,039 B1 | 7/2005 | Hind et al. |
| 2003/0083877 A1 | 5/2003 | Sugimoto |
| 2004/0225645 A1 | 11/2004 | Rowney et al. |
| 2004/0249892 A1 | 12/2004 | Barriga et al. |

(Continued)

FOREIGN PATENT DOCUMENTS

JP 2001101135 4/2001

(Continued)

OTHER PUBLICATIONS

Nadalin, "Web Services Security Policy (WS-Security Policy)", 2002, URL http://www-106.ibm.com/developerworks/webservices/library/ws-secpol.

(Continued)

*Primary Examiner* — Benjamin Lanier
(74) *Attorney, Agent, or Firm* — Shimokaji & Assoc., P.C.

(57) ABSTRACT

The invention provides security policy generation methods and devices for generating a security policy that is set up for an information processing apparatus comprises a step of generating an application model having a transmitter and a receiver of a message decided, for each of a plurality of messages that are communicated, a step of storing in advance a plurality of security patterns with a signer of electronic signature appended to the message as an undecided parameter, a step of selecting a security pattern that is a model of security policy to be set up for the transmitter or receiver of the message, corresponding to each of the plurality of messages included in the application model, and a step of substituting the identification information of the transmitter or receiver of each message included in the application model for the undecided parameter of the security pattern selected corresponding to the message.

8 Claims, 12 Drawing Sheets

U.S. PATENT DOCUMENTS

| | | |
|---|---|---|
| 2005/0005116 A1* | 1/2005 | Kasi et al. .................. 713/170 |
| 2005/0033813 A1 | 2/2005 | Bhogal et al. |
| 2005/0091338 A1 | 4/2005 | de la Huerga |
| 2005/0097339 A1 | 5/2005 | Wiley et al. |
| 2005/0188072 A1 | 8/2005 | Lee et al. |
| 2005/0204008 A1 | 9/2005 | Shinbrood |
| 2005/0251853 A1 | 11/2005 | Bhargavan et al. |
| 2006/0005228 A1 | 1/2006 | Matsuda |
| 2006/0023674 A1* | 2/2006 | Goring et al. ............... 370/338 |
| 2006/0179150 A1* | 8/2006 | Farley et al. ................. 709/228 |
| 2006/0265689 A1* | 11/2006 | Kuznetsov et al. .......... 717/117 |
| 2009/0044248 A1 | 2/2009 | Nakamura et al. |

FOREIGN PATENT DOCUMENTS

| | | |
|---|---|---|
| JP | 2002108818 | 4/2002 |
| JP | 2003196476 | 7/2003 |
| JP | 2004133816 | 4/2004 |
| JP | 2006-501493 | 1/2006 |
| WO | WO2004027547 | 4/2004 |

OTHER PUBLICATIONS

Christensen et al., "Web Services Description Language (WSDL) 1.1," W3C Note, 2001.

Office Action dated Mar. 9, 2010 from U.S. Appl. No. 12/182,889.

Office Action from U.S. Appl. No. 12/182,889, dated Jul. 30, 2010.

Office Action from U.S. Appl. No. 12/182,889, dated Nov. 12, 2010.

* cited by examiner

```
 1: <?xml version="1.0"?>
 2: <definitions name="myCompanyServices"
 3:     targetNamespace=
 4:         "http://www.myCompany.com/services/interfaces/myServices.wsdl"
 5:     xmlns="http://schemas.xmlsoap.org/wsdl/">
 6:
 7: <!-- Type definitions -->
 8: <types>
 9: ..........
10: </types>
11:
12: <!-- Message definitions -->
13: <message name="message1">
14:     <part name="part1-a".....  />
15:     <part name="part1-b"....  />
16: </message>
17:
18: <message name="message4">
19:     <part name="part4-a"" />
20: </message>
21:
22: <!-- Port type definitions -->
23: <portType name="myServiceType">
24:     <operation name="myServices1">
25:         <input message="message1" />
26:         <output message="message4" />
27:     </operation>
28: </portType>
29:
30: <!-- Binding definitions -->
31: <binding>
32: </binding>
33: </definitions>
```

NAME OF SECURITY PATTERN: ENCRYPTED MESSAGE (ET1)

DESCRIPTIVE TEXT:
SUMMARY: PROVISION OF SECRET MESSAGE
SITUATION: INFORMATION LEAKS

INTERACTION PATTERN:

| TRANS-MITTER | INTER-MEDIARY | RECEIVER |
|---|---|---|
| any | none | self |

MODEL OF SECURITY POLICY:
```
<policy>
  <Confidentiality>
    <Algorithm Type="AlgEncryption" URI="${ALGORITHM_URI}"/>
    <keyInfo>
      <TokenType>${TOKEN_TYPE_QNAME}</TokenType>
      <TokenIssuer>${TOKEN_ISSUER_NAME}</TokenIssuer>
    </keyInfo>
    <MessageParts>${MESSAGE_PARTS}</MessageParts>
  </Confidentiality>
</policy>
```

NAME OF SECURITY PATTERN: SIGNATURED MESSAGE (SI1)

DESCRIPTIVE TEXT:
SUMMARY: PROVISION OF COMPLETE MESSAGE
SITUATION: MESSAGE FORGERY

INTERACTION PATTERN:

| TRANS-MITTER | INTER-MEDIARY | RECEIVER |
|---|---|---|
| any | any | self |

MODEL OF SECURITY POLICY:

```
<policy>
  <Integrity>
    <Algorithm Type="AlgSignature" URI="${ALGORITHM_URI}"/>
    <TokenInfo>
      <TokenType>${TOKEN_TYPE_QNAME}</TokenType>
      <TokenIssuer>${TOKEN_ISSUER_NAME}</TokenIssuer>
      <Claims>
        <SubjectName>${INITIAL_SENDER_NAME}</SubjectName>
      </Claims>
    </TokenInfo>
    <MessageParts>${MESSAGE_PARTS}</MessageParts>
  </Integrity>
</policy>
```

```
 1:<Policy>
 2:  <SecurityToken>
 3:    <TokenType>UsernameToken</TokenType>
 4:  </SecurityToken>
 5:  <Confidentiality>
 6:    <KeyInfo>
 7:      <SecurityToken>
 8:        <TokenType>${TOKEN_TYPE_QNAME}</TokenType>
 9:        <TokenIssuer>${TOKEN_ISSUER_NAME}</TokenIssuer>
10:      </SecurityToken>
11:    </KeyInfo>
12:    <Claims>
13:      <SubjectName>${SUBJECT_NAME}</SubjectName>
14:    </Claims>
15:    <MessageParts>${MESSAGE_PARTS}</MessageParts>
16:  </Confidentiality>
17:  <Integrity>
18:    <TokenInfo>
19:      <SecurityToken>
20:        <TokenType>${TOKEN_TYPE_QNAME}</TokenType>
21:        <TokenIssuer>${TOKEN_ISSUER_NAME}</TokenIssuer>
22:      </SecurityToken>
23:    </TokenInfo>
24:    <MessageParts>${MESSAGE_PARTS}</MessageParts>
25:  </Integrity>
26:  <Confidentiality>
27:    <KeyInfo>
28:      <SecurityToken>
29:        <TokenType>${TOKEN_TYPE_QNAME}</TokenType>
30:        <TokenIssuer>${TOKEN_ISSUER_NAME}</TokenIssuer>
31:      </SecurityToken>
32:    </KeyInfo>
33:    <Claims>
34:      <SubjectName>${SUBJECT_NAME}</SubjectName>
35:    </Claims>
36:    <MessageParts>${MESSAGE_PARTS}</MessageParts>
37:  </Confidentiality>
38:</Policy>
```

Lines 5–16: AT1
Lines 17–25: NT1
Lines 26–37: EI1

[Figure 8]

```
 1:<Policy>
 2:   <SecurityToken>
 3:     <TokenType>UsernameToken</TokenType>
 4:   </SecurityToken>
 5:   <Confidentiality>
 6:     <KeyInfo>
 7:       <SecurityToken>
 8:         <TokenType>${TOKEN_TYPE_QNAME}</TokenType>
 9:         <TokenIssuer>${TOKEN_ISSUER_NAME}</TokenIssuer>
10:       </SecurityToken>
11:     </KeyInfo>                                                  ⎫
12:     <Claims>                                                    ⎬ AT1
13:       <SubjectName> ID OF THE SERVER 40 </SubjectName>
14:     </Claims>
15:     <MessageParts>//UsernameToken</MessageParts>
16:   </Confidentiality>
17:   <Integrity>
18:     <TokenInfo>
19:       <SecurityToken>
20:         <TokenType>${TOKEN_TYPE_QNAME}</TokenType>
21:         <TokenIssuer>${TOKEN_ISSUER_NAME}</TokenIssuer>         ⎬ NT1
22:       </SecurityToken>
23:     </TokenInfo>
24:     <MessageParts>//BookInfo</MessageParts>
25:   </Integrity>
26:   <Confidentiality>
27:     <KeyInfo>
28:       <SecurityToken>
29:         <TokenType>${TOKEN_TYPE_QNAME}</TokenType>
30:         <TokenIssuer>${TOKEN_ISSUER_NAME}</TokenIssuer>
31:       </SecurityToken>
32:     </KeyInfo>                                                  ⎬ EI1
33:     <Claims>
34:       <SubjectName> ID OF THE SERVER 50 </SubjectName>
35:     </Claims>
36:     <MessageParts>//CardInfo</MessageParts>
37:   </Confidentiality>
38:</Policy>
```

[Figure 9]
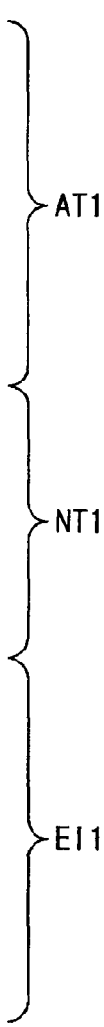

[Figure 10]
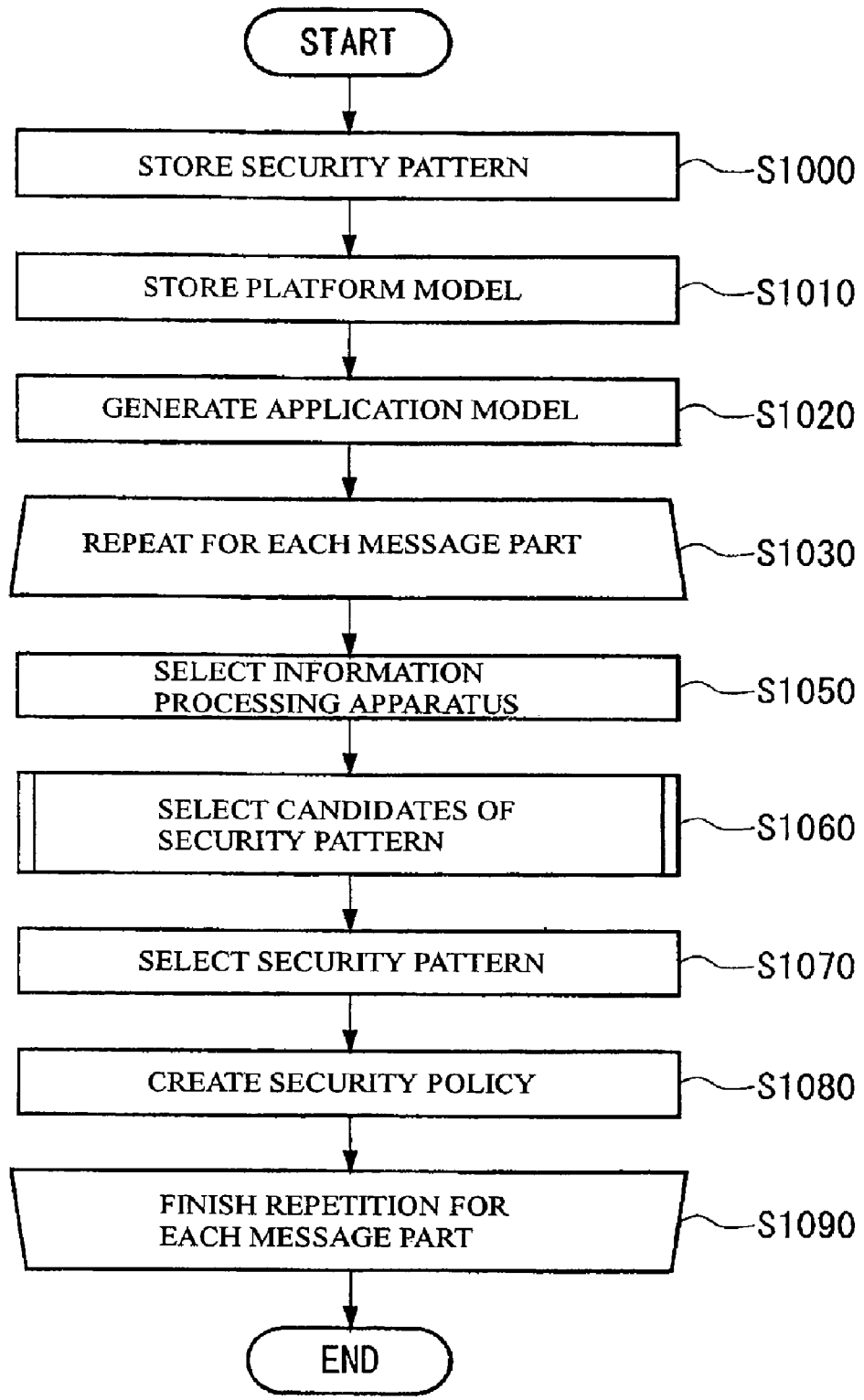

[Figure 11]
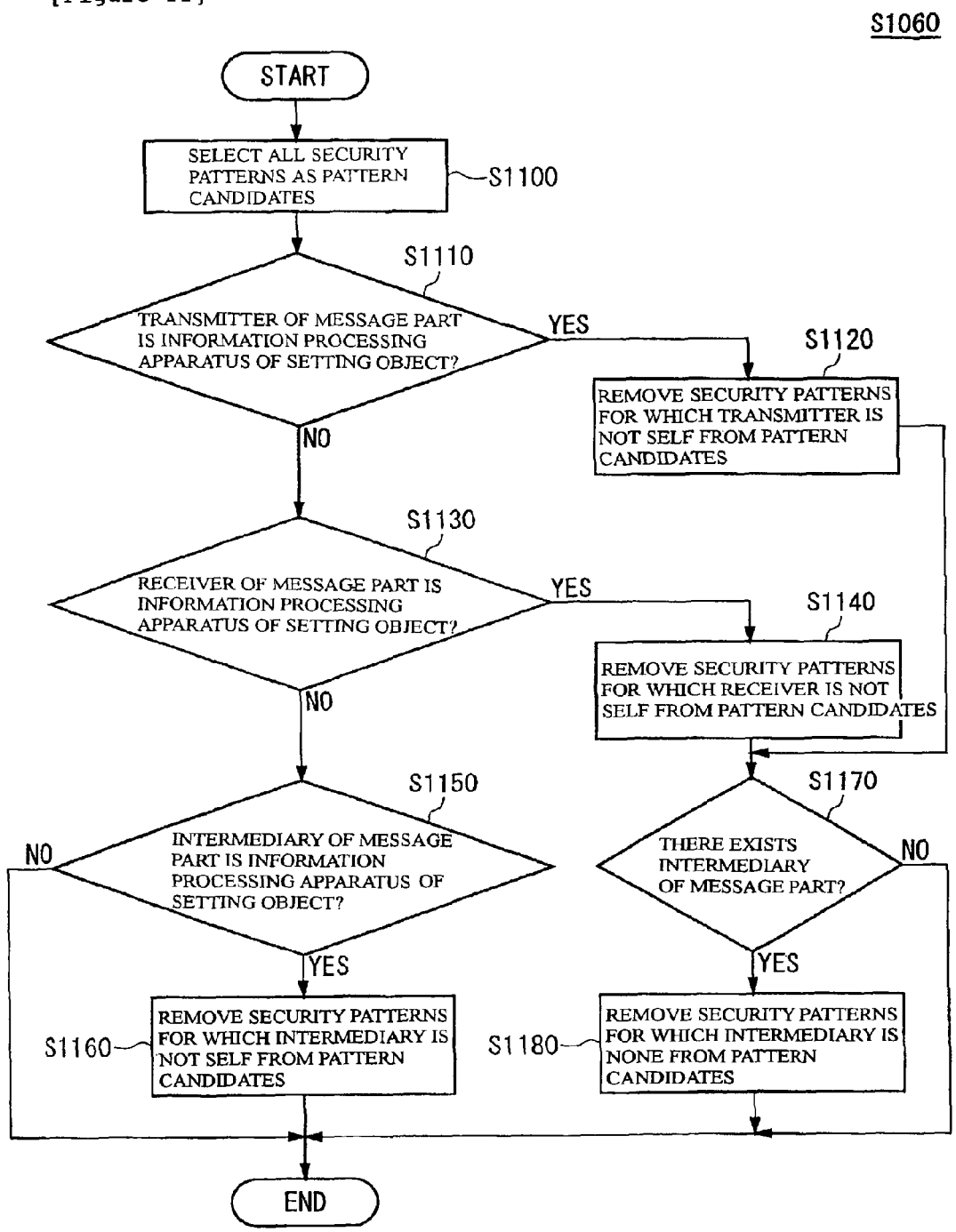

SECURITY POLICY GENERATION

FIELD OF THE INVENTION

The present invention relates to a security policy generation method, a security policy generation device, a program and a recording medium. More particularly, this invention relates to a security policy generation method, a security policy generation device, a program and a recording medium for generating a security policy that is set up for a transmitting or receiving message in at least one of a plurality of information processing apparatuses connected via a network.

BACKGROUND ART

In recent years, it is common that an information processing apparatus such as a server apparatus is communicated with another information processing apparatus connected via a network.

The following documents are considered herein:
[Patent Document 1] Published Unexamined Patent Application No. 2002-1008818
[Patent Document 2] Published Unexamined Patent Application No. 2001-101135
[Patent Document 3] Published Unexamined Patent Application No. 2003-196476
[Non-Patent Document 1] A. Nadalin, "Web Services Security Policy (WS-SecurityPolicy)", 2002. HomepageURL "http://www-106.ibm.com/developerworks/webservices/library/ws-secpol"
[Non-Patent Document 2] E. Christensen, F. Curbera, G. Meredith, and S. Weerawarana, "Web Services Description Language (WSDL) 1.1", W3C Note, 2001. HomepageURL "http://www.w3.org/TR/wsdl"

Along with the spread of the network such as the Internet, an unfair practice of using altered or falsified data has become a problem. On the contrary, a technique has been conventionally offered in which a security policy defining the restriction on data access, encryption, or electronic signature is generated and set up in the information processing apparatus (refer to patent documents 1 to 3).

According to patent document 1, a relatively complex security policy is simply created by preparing the models of security policy. Also, according to patent document 2, a technique has been offered in which a security policy is selected by the user from among the candidates of security policy settable in an apparatus of setting object. Also, according to patent document 3, a technique has been offered in which a security policy having a specific keyword is selected from among a plurality of security policies represented as a text file that are prepared. With these techniques, the user can be relieved of the trouble taken to select the security policy. Techniques to be mentioned in an embodiment of the invention, referring to non-patent documents 1 and 2, are also described.

The problems to be solved by the invention include the following. In recent years, a plurality of information processing apparatuses having a different administrator from each other typically cooperate with each other to provide the services such as a web service. For example, in the case of an online shopping system by use of credit cards, a purchaser terminal, seller server and card transaction system operate in a coordinated manner. To set up a security policy appropriate to each information processing apparatus in such a system, it is necessary to properly understand the contents or modes, etc. of communications performed between the information processing apparatuses and then perform the setting according to the contents or modes, etc. of the communications.

However, the techniques disclosed in the above described patent documents 1 to 3 aim to support the setting of a security policy with respect to a single information processing apparatus. Accordingly, with any of these techniques, a security policy can not be set up based on the contents, etc. of communications performed between the information processing apparatuses. On the contrary, a problem to be solved by the invention is to set up a suitable security policy for each information processing apparatus according to the whole business process implemented by a plurality of information processing apparatuses having a different administrator from each other.

SUMMARY OF THE INVENTION

Accordingly, an object of the invention is to provide a security policy generation method, security policy generation device, program and recording medium that can solve the above problem. To solve these problems, according to the invention, there is provided a security policy generation method for generating a security policy that decides at least one of an electronic signature to be appended to a message transmitted or received by an information processing apparatus and an encryption method for encrypting the message transmitted or received by the information processing apparatus. The security policy is set up for the information processing apparatus. A security policy generation method includes: an application model generation step of generating for each of a plurality of messages that are communicated using a distributed application program, an application model having a transmitter and a receiver of the message decided, according to an instruction of the user; a security pattern storage step of storing in advance a plurality of security patterns that are models of security policy having a signer of an electronic signature appended to the message or a decoder for decoding the encrypted message as an undecided parameter; a security pattern selection step of selecting according to an instruction of the user, a security pattern that is a model of security policy to be set up for the transmitter or receiver of the message, corresponding to each of the plurality of messages included in the application model; and a security policy generation step of generating a security policy by substituting the identification information of the transmitter or receiver of each message included in the application model for the undecided parameter of the security pattern selected corresponding to the message.

There are also provided a security policy generation device using the security policy generation method, a program for enabling a computer to operate as the security policy generation device, and a recording medium on which the program is recorded. It is noted that in the above described outlines of the invention, not all essential features of the invention are listed. Subcombinations of these feature groups can also become an invention. Thus, with this invention, a suitable security policy can be set up for each of a plurality of information processing apparatuses for performing a distributed application program.

BRIEF DESCRIPTION OF THE DRAWINGS

Advantageous embodiments of the present invention will now be described, by way of example only, with reference to the drawings, in which:

FIG. 2 shows an example of an interface setting information 20;

FIG. 4 shows an example of a security pattern 400a;

FIG. 5 shows an example of a security pattern 400b;

FIG. 7 shows exemplary security patterns in an application example of the security policy generation device 30 according to the embodiment;

FIG. 8 shows an exemplary security policy obtained by applying an application model;

FIG. 9 shows an exemplary security policy obtained by applying a platform model;

FIG. 10 shows an operational flow of an exemplary process of the security policy generation device 30 creating a security policy;

FIG. 11 shows the details of process S1060; and

DESCRIPTION OF SYMBOLS

Figure 1:
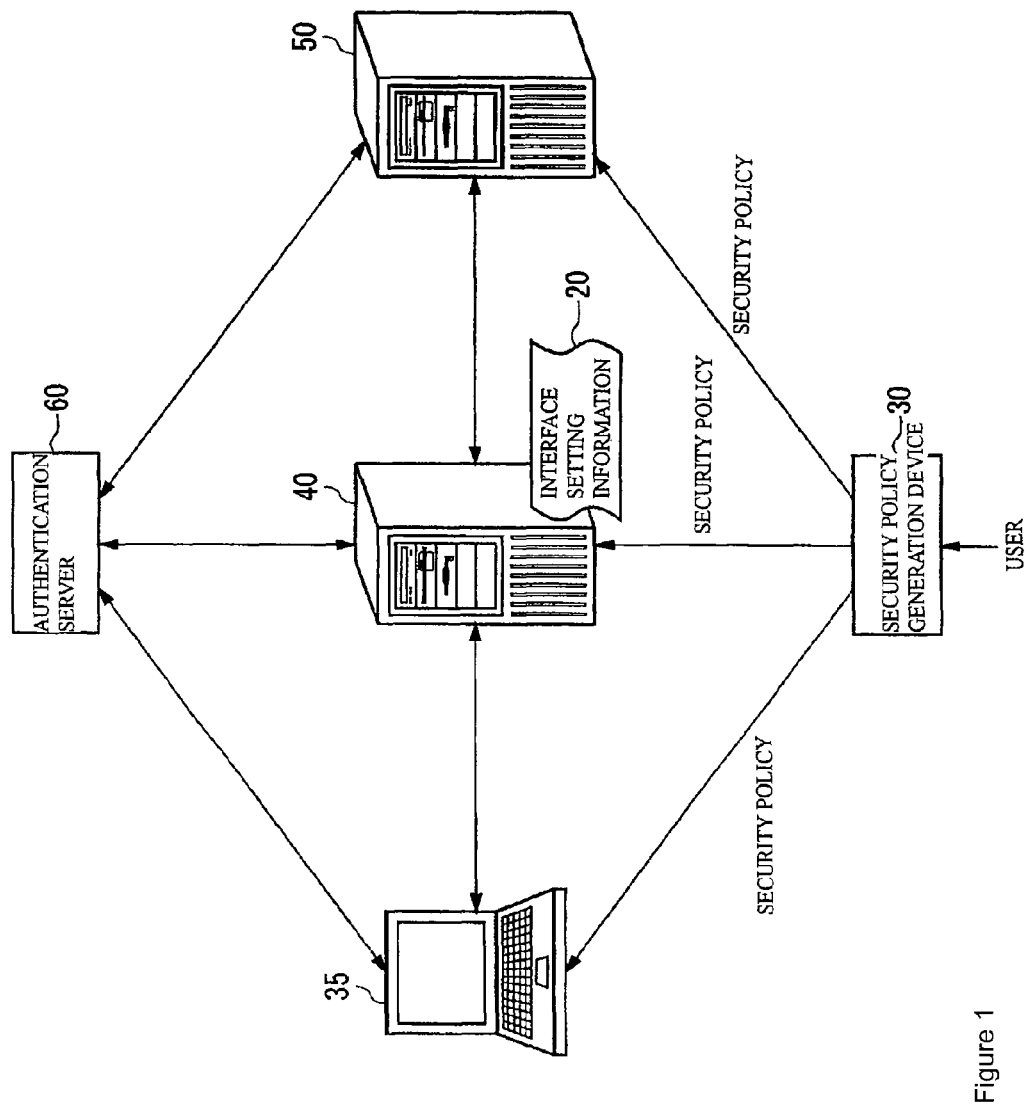
FIG. 1 shows a configuration of an information processing system 10.

10 . . . Information processing system
20 . . . Interface setting information
30 . . . Security policy generation device
35 . . . Terminal
40 . . . Server
50 . . . Server
60 . . . Authentication server
300 . . . Application model generation part
310 . . . Security pattern storage part
320 . . . Candidate selection part
330 . . . Security pattern selection part
340 . . . Platform model storage part
350 . . . Security policy generation part
400 . . . Security pattern

DETAILED DESCRIPTION OF THE INVENTION

The present invention provides security policy generation methods, security policy generation devices, and program and recording medium that can solve the above problem. To solve the above problem, according to the invention, there are provided (1) a security policy generation method for generating a security policy (2) a security policy generation device using the security policy generation method, (3) a program for enabling a computer to operate as the security policy generation device and (4) a recording medium on which the program is recorded.

The security policy generation method is for generating a security policy that decides at least one of an electronic signature to be appended to a message transmitted or received by an information processing apparatus and an encryption method for encrypting the message transmitted or received by the information processing apparatus. A security policy being set up for the information processing apparatus.

An example security policy generation method includes: an application model generation step of generating for each of a plurality of messages that are communicated using a distributed application program, an application model having a transmitter and a receiver of the message decided, according to an instruction of the user; a security pattern storage step of storing in advance a plurality of security patterns that are models of security policy having a signer of an electronic signature appended to the message or a decoder for decoding the encrypted message as an undecided parameter; a security pattern selection step of selecting according to an instruction of the user, a security pattern that is a model of security policy to be set up for the transmitter or receiver of the message, corresponding to each of the plurality of messages included in the application model; and a security policy generation step of generating a security policy by substituting the identification information of the transmitter or receiver of each message included in the application model for the undecided parameter of the security pattern selected corresponding to the message. With this invention, a suitable security policy can be set up for each of a plurality of information processing apparatuses for performing a distributed application program.

The invention will be described below through embodiments of the invention. The embodiments described below do not limit the invention, and not all the combinations of the features described in an embodiment are essential as the means for solving the problems.

FIG. 1 shows a configuration of an information processing system 10. The information processing system 10 includes a security policy generation device 30, terminal 35, server 40, server 50 and authentication server 60. In the security policy generation device 30, a security policy is set up for at least one of the terminal 35, server 40 and server 50, each being an exemplary information processing system. The security policy decides at least one of an electronic signature to be appended to a message transmitted or received by an information processing apparatus and an encryption method for encrypting the message transmitted or received by the information processing apparatus, each of the electronic signature and encryption method being set up for the information processing apparatus.

The terminal 35, operated by a user purchasing a commodity or service, etc, sends to the server 40 the order information for ordering the commodity as well as the identification number of a credit card, etc. The server 40, operated by a seller selling commodities, etc, sends to the server 50 the identification number of a credit card, etc. received together with the order information, when receiving the order information from the security policy generation device 30. In the server 40, interface setting information 20 is decided which defines the interface regarding services provided by the server 40 for the terminal 35 or server 50.

The server 50, managed by an issuing corporation of a credit card, etc, determines the validity of the identification number and the credit limit, etc. of the credit card identified by use of the identification number, when receiving the identification number from the server 40. Then, the server 50 sends back the determination result to the server 40. In response to this, the server 40 sends to the terminal 35 the information indicating whether or not the order is acceptable.

The authentication server 60 manages encryption key or electronic certificate for the process of encrypting a message or appending an electronic signature to a message. The authentication server 60 issues the encryption key or electronic certificate, etc. in response to a request from the terminal 35, server 40 and server 50. An example of the authentication server 60 is Certified Authority (CA) which issues an X.509-compliant encryption key, etc.

FIG. 2 shows an example of the interface setting information 20. The interface setting information 20 defines the interface of services provided by the server 40 for the terminal 35 or server 50. Specifically, the $1^{st}$ to $6^{th}$ lines of the interface setting information 20 define a namespace in the interface setting information 20 or in a message transmitted or received by the server 40. With the namespace, the meaning of an identifier, such as a tag used in the interface setting information 20 or the message can be defined.

The 7$^{th}$ to 10$^{th}$ lines of the interface setting information 20 define the type of name uniquely used in the interface setting information 20. The 12$^{th}$ to 20$^{th}$ lines of the interface setting information 20 define the message format for each of a message inputted for the service processing and a message outputted as the result of the service processing.

The 22$^{nd}$ to 28$^{th}$ lines of the interface setting information 20 define a program performing the service processing and the I/O of the program. Specifically, myServices1 specified in operation tag indicates the name of program; message1 specified in input tag indicates the identification information of a message inputted into the program; message4 specified in output tag indicates the identification information of a message outputted from the program. The 30$^{th}$ to 32$^{nd}$ lines of the interface setting information 20 define the communication protocol, etc. specifically used in the transmitting or receiving process with respect to the transmitting or receiving of each message.

The interface setting information 20 is described using interface description language. For example, it may be described using WSDL (Web Services Description Language). The details of WSDL are described in non-patent document 2, and hence repeated explanation thereof is omitted here.

Figure 3:
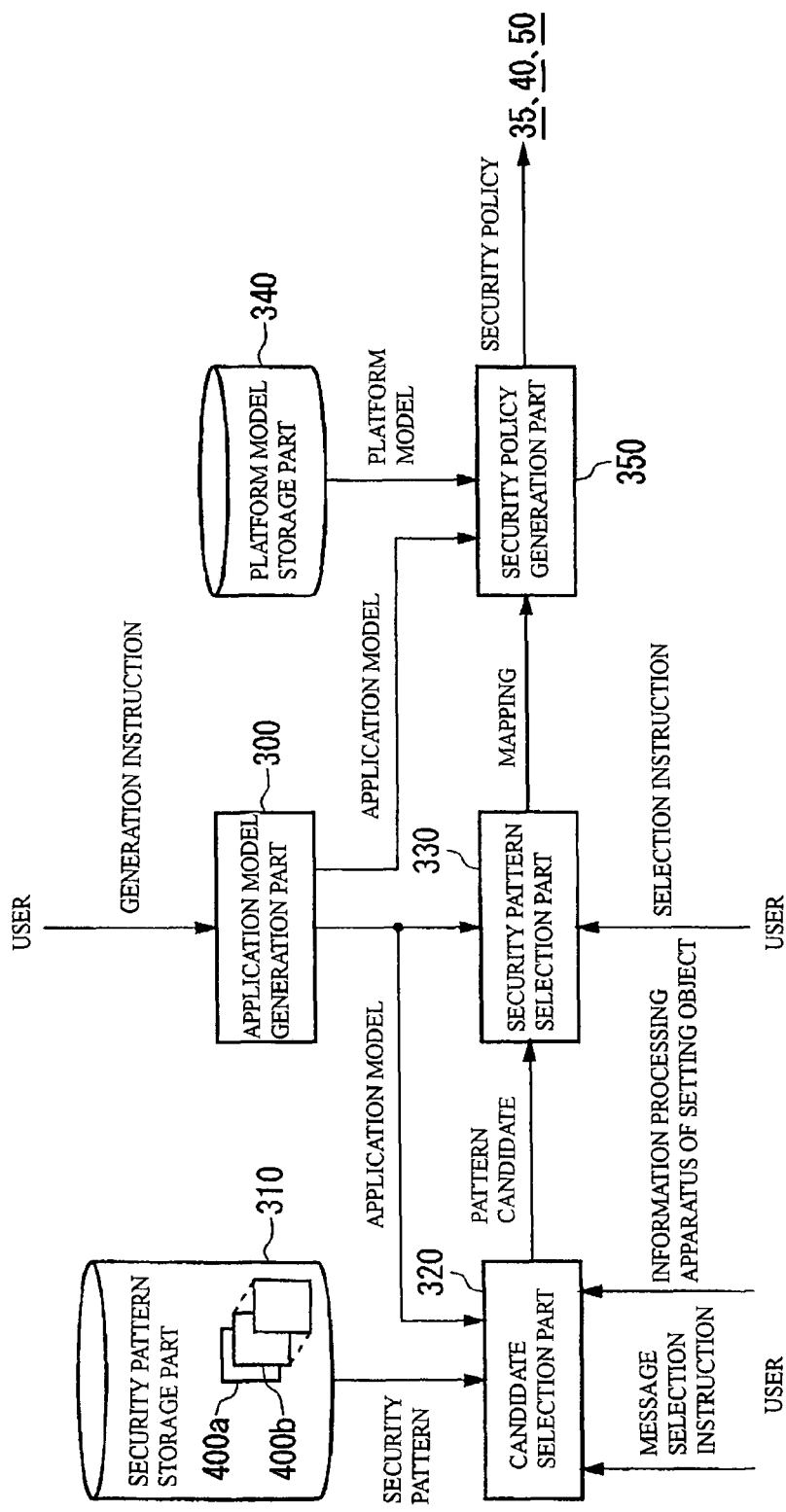
FIG. 3 shows a configuration of a security policy generation device 30.

FIG. 3 shows a configuration of the security policy generation device 30. The security policy generation device 30 includes an application model generation part 300, a security pattern storage part 310, a candidate selection part 320, a security pattern selection part 330, a platform model storage part 340 and a security policy generation part 350. The application model generation part 300 generates for each of a plurality of messages that are communicated using a distributed application program, an application model having a transmitter and a receiver of the message decided, according to an instruction of the user. The application model may further decide for each message the identification information of the message or the intermediary serving as an information processing apparatus that repeats the message.

The distributed application program as used herein means a program which enables a plurality of information processing apparatuses to communicate with each other so that the information processing apparatuses operate according to a request of the user. Thus, the distributed application program may not necessarily be a single dependent program but may be a group of programs installed into each of a plurality of information processing apparatuses.

The security pattern storage part 310 stores a plurality of security patterns that are models of security policy with a signer of electronic signature appended to a message or a decoder for decoding the encrypted message as an undecided parameter. For example, the security pattern storage part 310 may store each of a security pattern for transmitter, a security pattern for receiver and a security pattern for intermediary, each being a model of security pattern settable in each of the transmitter, receiver and intermediary of the message. The security pattern may further include a parameter used in a process of encrypting or decoding a message, a parameter used in a process of generating an electronic signature appended to a message or a parameter used in a process of authenticating the electronic signature as an undecided parameter. As specific examples, a security pattern 400a and a security pattern 400b each stored in the security pattern storage part 310 will be described later.

In the candidate selection part 320, the user inputs an instruction for specifying a message and an information processing apparatus for which a security policy is to be set up. Then, according to the determination of whether the information processing apparatus of security policy setting object is any one of a transmitter, a receiver and an intermediary of a message of security policy setting object, the candidate selection part 320 selects the candidates of security pattern which can be set up for the information processing apparatus. In addition, the candidate selection part 320 may select the candidates of security pattern according to the determination of whether there exists an intermediary in the message of setting object. The selected candidates are referred to as a pattern candidate.

The security pattern selection part 330 selects according to an instruction of the user, a security pattern that is a model of security policy to be set up for the transmitter or receiver of the message, corresponding to each of the plurality of messages included in the application model. For example, the security pattern selection part 330 may select according to an instruction of the user, one security pattern from among the candidates of security pattern selected by the candidate selection part 320.

The platform model storage part 340 stores an encryption processing parameter used in a process of encryption or decoding by an information processing apparatus, the encryption processing parameter being specified in advance for each information processing apparatus. In addition, the platform model storage part 340 stores a signature processing parameter used in the process of generating the electronic signature or in the process of authenticating the electronic signature by the information processing apparatus, the signature processing parameter being specified in advance for each information processing apparatus.

The security policy generation part 350 generates a security policy by substituting the identification information of the transmitter or receiver of each message included in the application model for the undecided parameter of the security pattern selected corresponding to the message. In addition, the security policy generation part 350 further substitutes the encryption processing parameter or signature processing parameter in the information processing apparatus of security policy setting object for the undecided parameter of the security pattern. Alternatively, the security policy generation part 350 may substitute the information as inputted by the user for the undecided parameter.

FIG. 4 shows an example of a security pattern 400a. The name of the security pattern 400a is "encrypted message (ET1)". With the security pattern 400a, a security policy that allows the information processing apparatus to receive only a message encrypted according to a predetermined method can be generated.

Specifically, the security pattern 400a includes descriptive texts described in natural language. A descriptive text "provision of secret message" describing the summary of the security pattern is included in the security pattern 400a. Also, a descriptive text "information leaks" describing the presumed situation with respect to the security pattern is included in the security pattern 400a. This descriptive text indicates the attack or threat to be guarded against using the security policy to be set up, or the countermeasure against these practices.

Accordingly, as compared with a case where only the setting information regarding the information processing apparatus is described, the meaning of the security pattern can be shown so that the user can more easily understand it.

In addition, the security pattern 400a includes transmitter type, receiver type and intermediary type. Specifically, the security pattern 400a includes as the transmitter type any one of the presence attribute (any) indicating the presence of an information processing apparatus for transmitter in the message of security pattern 400*a* setting object, the presence inhibition attribute (none) indicating the prohibition of the presence of an information processing apparatus for transmitter in the message of security pattern 400*a* setting object, and the self attribute (self) indicating that the security pattern 400*a* is a security pattern for transmitter.

Similarly, the security pattern 400*a* includes as the receiver type any one of the presence attribute (any) indicating the presence of an information processing apparatus for receiver in the message of security pattern 400*a* setting object, the presence inhibition attribute (none) indicating the prohibition of the presence of an information processing apparatus for receiver in the message of security pattern 400*a* setting object and the self attribute (self) indicating that the security pattern 400*a* is a security pattern for a receiver.

Similarly, the security pattern 400*a* includes as the intermediary type any one of the presence attribute (any) indicating the presence of an information processing apparatus for intermediary in the message of security pattern 400*a* setting object, the presence inhibition attribute (none) indicating the prohibition of the presence of an information processing apparatus for intermediary in the message of security pattern 400*a* setting object, and the self attribute (self) indicating that the security pattern 400*a* is a security pattern for an intermediary.

More specifically, referring to the drawing, the intermediary type is none; therefore the security pattern 400*a* indicates the inhibition of the presence of an intermediary in the message of security pattern 400*a* setting object. In the drawing, the transmitter type is any; therefore the security pattern 400*a* indicates the presence of a transmitter in the message of security pattern 400*a* setting object. In the drawing, the receiver type is self; therefore the security pattern 400*a* indicates that it is a security pattern for receiver.

In addition, the security pattern 400*a* includes a model of security policy with the name of a message of setting object, the encryption algorithm, the type of cipher and the identification information regarding Certified Authority as an undecided parameter. For example, referring to the drawing, a string of characters enclosed in braces with $ mark indicates an undecided parameter. More specifically, ${ALGORITHM_URL} indicates the location of a program implementing the encryption algorithm. ${TOKEN_TYPE_QNAME} indicates the type of cipher, which specifically indicates the kind of electronic certificate, etc. ${TOKEN_ISSUER_NAME} indicates the identification information regarding the authentication server 60, etc. being an issuer of encryption key.

In the drawing, a model of security policy is represented as text data. Alternatively, the security pattern 400*a* may hold a model of security policy being divided into a plurality of segments. For example, the security pattern 400*a* may hold an undecided-parameter segment and a non-undecided parameter segment as fragmentary text data. In this case, a process of retrieving an undecided parameter from the security policy can be made more efficient.

In order to enable the security policy generation part 350 to properly select an undecided parameter to be substituted, the security policy may further include parameter type indicating the definition of information to be stored in the undecided parameter, the parameter type corresponding to each undecided parameter. In this case, each message of an application model may include parameter type indicating the definition of information indicated by a parameter included in the above message, the parameter type corresponding to each parameter. Accordingly, the security policy generation part 350 can quickly select an undecided parameter to be substituted by not scanning text data being a model of security policy but determining the correspondence regarding parameter type.

FIG. 5 shows an example of a security pattern 400*b*. The name of the security pattern 400*b* is "signed message (SI1)". The security pattern 400*b*, which is a setting for the receiver of a message, includes the transmitter of the message as an undecided parameter and indicates that only the reception of the message with the electronic signature of the transmitter appended thereto is permitted.

Specifically, the security pattern 400*b* includes descriptive texts described in natural language. A descriptive text "provision of complete message" describing the summary of the security pattern is included in the security pattern 400*b*. In addition, a descriptive text "message forgery" describing the presumed situation with respect to the security pattern is included in the security pattern 400*b*. This descriptive text indicates the attack or threat to be guarded against using the security policy to be set up, or the countermeasure against these practices.

Also, the security pattern 400*b* decides transmitter type, receiver type and intermediary type. More specifically, referring to the drawing, the intermediary type is any; therefore, the security pattern 400*b* indicates the presence of an intermediary in the message of setting object. Referring to the drawing, the transmitter type is any; therefore, the security pattern 400*b* indicates the presence of a transmitter in the message of setting object. Referring to the drawing, the receiver type is self; therefore, the security pattern 400*b* indicates that it is a security pattern for receiver.

In addition, the security pattern 400*b* includes a model of security policy with the name of a message of setting object, the encryption algorithm, the type of cipher and the identification information regarding Certified Authority as an undecided parameter. For example, referring to the drawing, a string of characters enclosed in braces with $ mark indicates an undecided parameter. More specifically, ${ALGORITHM_URI} indicates the location of a program implementing the encryption algorithm. ${TOKEN_TYPE_QNAME} indicates the type of cipher, which specifically indicates the kind of electronic certificate, etc. ${TOKEN_ISSUER_NAME} indicates the identification information regarding the authentication server 60, etc. being an issuer of encryption key. ${INITIAL_SENDER_NAME} indicates the identification information regarding the transmitter of a message.

In response that the security pattern 400*b* is selected corresponding to the message, the security policy generation part 350 substitutes the identification information of the transmitter of the message corresponding to the security pattern 400*b* for the undecided parameter of the security pattern 400*b* regarding the transmitter. In this way, according to the security policy generation device 30 according to the embodiment, the tag information, etc. indicating the security policy format are prepared in advance as security pattern, thus setting only a different part as undecided parameter according to the message of setting object. Accordingly, a suitable security pattern can be quickly created.

In the drawing, a model of security policy is shown as single text data described in a description language called WS-SecurityPolicy (refer to non-patent document 1). Alternatively, the security pattern 400*b* may hold a model of security policy using another data format. For example, the security pattern 400*b* may hold a fragment of that part of security policy that identifies an undecided parameter.

Figure 6:
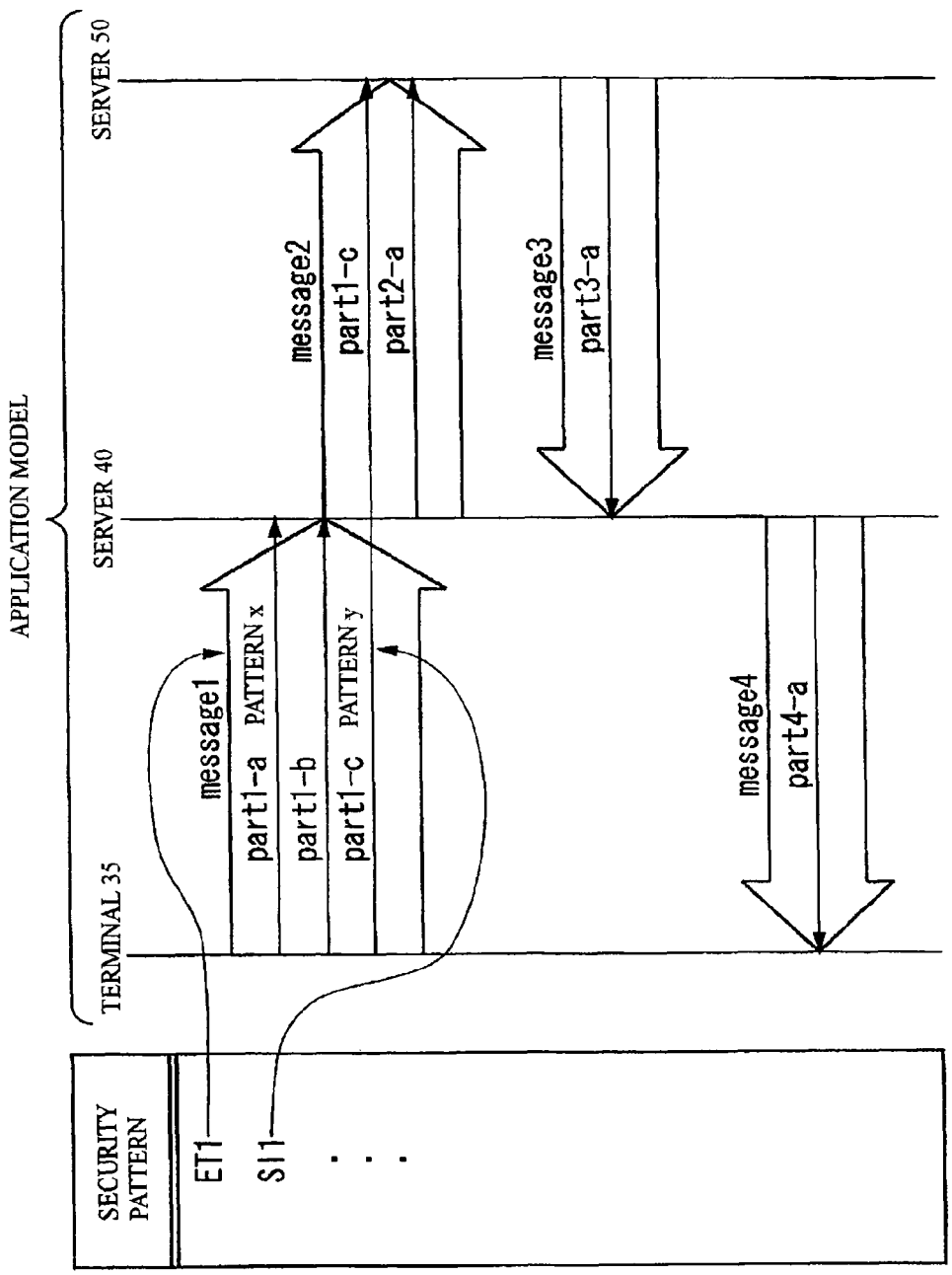
FIG. 6 shows an exemplary application model.

FIG. 6 shows an exemplary application model. Firstly the process of generating an application model will be described with reference to the drawing. The application model generation part 300 defines according to an instruction of the user, the communications of a distributed application program that is processed in a coordinated manner by a plurality of information processing apparatuses. Each communication of the distributed application program is defined based on the business scenario for electric commerce, etc. implemented by the distributed application program.

For example, a terminal 35 sends order information for ordering a commodity, etc. as a message to a server 40. In addition, the terminal 35 sends information regarding payments, such as credit card number, via the server 40 as a message to a server 50. The server 40 sends information regarding commodity price, etc. as a message to the server 50. The server 50 sends information regarding the availability of payment as a message to the server 40. The server 40 sends information regarding commodity receipt, etc. as a message to the terminal 35. The user arranges each of the above described messages in the business scenario on the window by use of GUI. Accordingly, the user can specify the transmitter, receiver, etc. of each message by performing an intuitive operation as in the drawing of an event trace diagram for business.

In response to the above described process, the application model generation part 300 decides the identification information, transmitter, receiver and intermediary for each message. Specifically, regarding message1, the application model generation part 300 specifies the terminal 35 as the transmitter, and specifies the server 40 as the receiver. Regarding message2, the application model generation part 300 specifies the server 40 as the transmitter, and specifies the server 50 as the receiver. Regarding message3, the application model generation part 300 specifies the server 50 as the transmitter, and specifies the server 40 as the receiver. Regarding message4, the application model generation part 300 specifies the server 40 as the transmitter, and specifies the terminal 35 as the receiver.

The application model generation part 300 decides at least one message part included in each message. Specifically, the application model generation part 300 decides part1-*a*, part1-*b* and part1-*c* as a message part included in message1. The application model generation part 300 decides part1-*c* and part2-*a* as a message part included in message2. In this case, the transmitter of message part part1-*c* is the terminal 35; the intermediary of message part part1-*c* is the server 40; the receiver of message part part1-*c* is the server 50. In this way, the application model generation part 300 may decide a different transmitter or receiver for each massage part even within the same message. In addition, the application model generation part 300 decides part3-*a* as a message part included in message3, and decides part4-*a* as a message part included in message4.

Alternatively, the application model generation part 300 may automatically generate an application model according to the interface setting information 20 provided for the server 40. For example, the application model generation part 300 may automatically generate a message part received by the server 40 according to the message format decided in the interface setting information 20. In this case, it is sufficient for the user to perform the message definition only for information processing apparatuses in which no interface setting information is decided.

The user selects security patterns from a tool box storing a plurality of security patterns on the GUI and arranges the selected security patterns corresponding to the message parts. Consequently, the security pattern selection part 330 can select a security pattern that is a model of security policy set up for the transmitter or receiver of a message part, corresponding to each message part. For example, the security pattern selection part 330 can select security pattern ET1 corresponding to message part part1-*a*, and can select security pattern SI1 corresponding to message part part1-*c*.

An example of a process of the information processing system 10 sequentially substituting a value for each undecided parameter of security pattern will now be explained.

FIG. 7 shows exemplary security patterns in an application example of the security policy generation device 30 according to the embodiment. The security pattern selection part 330 selects security patterns corresponding to each of a plurality of messages. For example, referring to the drawing, the security pattern selection part 330 selects security patterns AT1, NT1 and EI1 corresponding to message parts part1-*a*, part1-*b* and part1-*c* shown in FIG. 6, respectively. In the drawing, these selected security patterns are represented as a sequence of linked text data.

The security pattern AT1, a setting for the receiver of the message, includes the receiver of the message as an undecided parameter and indicates that only the reception of the message encrypted using a cipher that the receiver can decode is permitted. AT stands for Authentication. Security pattern AT1 includes ${TOKEN_TYPE_QNAME}, ${TOKEN_ISSUER_NAME}, ${SUBJECT_NAME} and ${MESSAGE_PARTS} as undecided parameters.

${TOKEN_TYPE_QNAME} indicates the type of cipher, and specifically indicates the kind, etc. of electronic certificate. ${TOKEN_ISSUER_NAME} indicates the identification information regarding the authentication server 60, etc. serving as the issuer of encryption key. ${SUBJECT_NAME} indicates a receiver who is permitted to decode the encryption key. ${MESSAGE_PARTS} indicates message parts to be encrypted. Specifically, the message parts indicating the password, etc. for certifying the validity of transmitter are substituted for ${MESSAGE_PARTS}.

Security pattern NT1, a setting for receiver, indicates that only the reception of messages to which the electronic signature of a transmitter is appended is permitted. Accordingly, the transmitter of a message cannot repudiate the fact of transmission of the message, and hence the name NT is employed which stands for Non-repudiation.

Security pattern NT1 includes ${TOKEN_TYPE_QNAME}, ${TOKEN_ISSUER_NAME} and ${MESSAGE_PARTS} as undecided parameters. ${TOKEN_TYPE_QNAME} indicates the type of cipher, and specifically indicates the kind, etc. of electronic certificate. ${TOKEN_ISSUER_NAME} indicates the identification information regarding the authentication server 60, etc. serving as the issuer of encryption key or electronic certificate. ${MESSAGE_PARTS} indicates message parts to which electronic signature is applied.

Specifically, the order information of a transmitter ordering commodities, etc. from a receiver is substituted for ${MESSAGE_PARTS}.

Security pattern EI1, a setting for receiver, indicates that only the reception of messages which can not be decoded by an intermediary of the message and at the same time can be decoded by the receiver is permitted. Security pattern EI1 includes ${TOKEN_TYPE_QNAME}, ${TOKEN_ISSUER_NAME}, ${SUBJECT_NAME} and ${MESSAGE_PARTS} as undecided parameters.

${TOKEN_TYPE_QNAME} indicates the type of cipher, and specifically indicates the kind, etc. of electronic certificate. ${TOKEN_ISSUER_NAME} indicates the identification information regarding the authentication server 60, etc. serving as the issuer of encryption key. ${SUBJECT_

NAME} indicates a receiver who is permitted to decode the encryption key. ${MESSAGE_PARTS} indicates message parts to be encrypted. Specifically, the ${message_parts} indicating the contents sent from a transmitter to a receiver without the knowledge of an intermediary are substituted for ${MESSAGE_PARTS}.

FIG. 8 shows an exemplary security policy obtained by applying an application model. The security policy generation part 350 substitutes the identification information of the transmitter or receiver of each message for the undecided parameter of the security pattern selected corresponding to each message. The substituted parameters are underlined.

For example, in response that security pattern AT1 is selected corresponding to message part part1-*a*, the security policy generation part 350 substitutes the ID of the server 40 being the receiver of the message for variable ${SUBJECT_NAME} being the undecided parameter regarding the receiver of the security pattern on the 13$^{th}$ line. On the 34$^{th}$ line, the security policy generation part 350 substitutes the ID of the server 50 for variable ${SUBJECT_NAME}.

In addition, the security policy generation part 350 substitutes the identification information of each message part for the undecided parameter of the security pattern selected corresponding to the message. For example, on the 15$^{th}$ line, the security policy generation part 350 substitutes //Username-Token indicating the location, etc. of message part part1-*a* for variable ${MESSAGE_PARTS}.

On the 24$^{th}$ line, the security policy generation part 350 substitutes //BookInfto indicating the location, etc. of message part part1-*b* for variable ${MESSAGE_PARTS}. On the 36$^{th}$ line, the security policy generation part 350 substitutes //CardInfo being the identification information of message part part1-*c* for variable ${MESSAGE_PARTS}. The parameters such as //CardInfo are shown here as an example; information, etc. indicating the location of the message part (URI: Uniform Resource Indicator) may practically be substituted for the undecided parameters, or text data indicating the message part itself may be substituted.

Alternatively, in order to enable the security policy generation part 350 to properly select an undecided parameter to be substituted for, the security policy may further include parameter type indicating the definition of the information which is to be stored in the undecided parameter, corresponding to each undecided parameter. In this case, each message of application model may include parameter type indicating the definition of the information indicated by each parameter included in the message, the parameter type corresponding to each parameter. Accordingly, the security policy generation part 350 can quickly select an undecided parameter to be substituted for by not scanning text data being a model of security policy but determining the correspondence regarding the parameter type. When the application model has no parameter type corresponding to that of the security policy, the security policy generation part 350 may substitute the parameter type for the undecided parameter instead of performing the substitution process. This allows the definition of undecided parameters to be properly known by the user, thus making it easy to manually decide undecided parameters of security pattern.

As described above with reference to the drawing, the security policy generation part 350 can generate a security policy by replacing with predetermined parameters the variable parts of a model of security policy as represented as text data.

FIG. 9 shows an exemplary security policy obtained by applying a platform model. The security policy generation part 350 further substitute the encryption processing parameter or signature processing parameter for the information processing apparatus of security policy setting object for the undecided parameter of security pattern. For example, on the 8$^{th}$, 20$^{th}$ and 29$^{th}$ lines, the security policy generation part 350 substitutes parameter X509v3 indicating the standard specification of electronic certificate for variable ${TOKEN_TYPE_QNAME}. On the 9$^{th}$, 21$^{st}$ and 30$^{th}$ lines, the security policy generation part 350 substitutes parameter VeriSign indicating the encryption key, etc. generated by software from VeriSign, Inc. (a registered trademark) for variable ${TOKEN_ISSUER_NAME}.

As described above, with the security policy generation device 30 according to the embodiment, the undecided parameters of the selected security patterns can be sequentially decided according to the application model and platform model. This makes it possible to easily create an appropriate security policy.

FIG. 10 shows an operational flow of an exemplary process of the security policy generation device 30 creating a security policy. The security pattern storage part 310 stores a plurality of security patterns in advance according to an instruction of the administrator, etc. of the security policy generation device 30 (S1000). The platform model storage part 340 stores a platform model decided for each information processing apparatus in advance according to an instruction of the administrator, etc. of the security policy generation device 30 (S1010).

The application model generation part 300 generates for each of a plurality of messages that are communicated using a distributed application program, an application model having the transmitter, receiver, intermediary, etc. of the message decided, according to an instruction of the user (S1020).

The security policy generation device 30 repeats the following process for each of a plurality of messages included in the application model (S1030). Firstly the candidate selection part 320 selects an information processing apparatus of security policy setting object according to an instruction of the user (S1050).

Then, the candidate selection part 320 selects the candidates of security pattern settable in the information processing apparatus according to the determination of whether the information processing apparatus of security policy setting object is any one of the transmitter, receiver or intermediary of the message part of security policy setting object (S1060).

The security pattern selection part 330 selects a security pattern that is a model of security policy to be set up for the transmitter or receiver of the message part, corresponding to the message part, according to an instruction of the user (S1070). For example, in the security pattern selection part 330, a security pattern may be selected from among the candidates of security pattern selected by the candidate selection part 320, which are shown to the user, according to an instruction of the user.

The security policy generation part 350 generates a security policy by substituting the identification information regarding the transmitter or receiver of the message part for the undecided parameter of the security pattern selected corresponding to the message part (S1080). The security policy generation part 350 may further substitute the encryption processing parameter or signature processing parameter for the information processing apparatus of security policy setting object for the undecided parameter of the security pattern. The security policy generation device 30 repeats the above described process for each message part (S1090).

FIG. 11 shows the details of process S1060. The candidate selection part 320 selects as the pattern candidates all the security patterns stored in the security pattern storage part 310 (S1100). If the transmitter of the message part is the information processing apparatus of setting object (S1110: YES), then the candidate selection part 320 removes the security patterns for which the transmitter type of interaction pattern is not self from the pattern candidates (S1120), and then the flow proceeds to S1170.

If the transmitter of the message part is not the information processing apparatus of setting object (S1110: NO), then the candidate selection part 320 determines whether or not the receiver of the message part is the information processing apparatus of setting object (S1130). If so (S1130: YES), then the candidate selection part 320 removes the security patterns for which the receiver type of interaction pattern is not self from the pattern candidates (S1140).

Subsequently, if there exists an intermediary of the message part (S1170: YES), then the candidate selection part 320 removes the security patterns for which the intermediary type is none from the pattern candidates (S1180).

On the other hand, if the receiver of the message part is not the information processing apparatus of setting object (S1130: NO), then the candidate selection part 320 determines whether or not the intermediary of the message part is the information processing apparatus of setting object (S1150). If so (S1150: YES), then the candidate selection part 320 removes the security patterns for which the intermediary type of interaction pattern is not self from the pattern candidates (S1160).

In this way, the candidate selection part 320 can select a suitable security pattern according to the determination of whether the information processing apparatus of setting object is any one of the transmitter, receiver and intermediary of the message part. Accordingly, the number of security pattern options can be reduced; therefore the user can be relieved of the operational load taken to select the security pattern.

Figure 12:
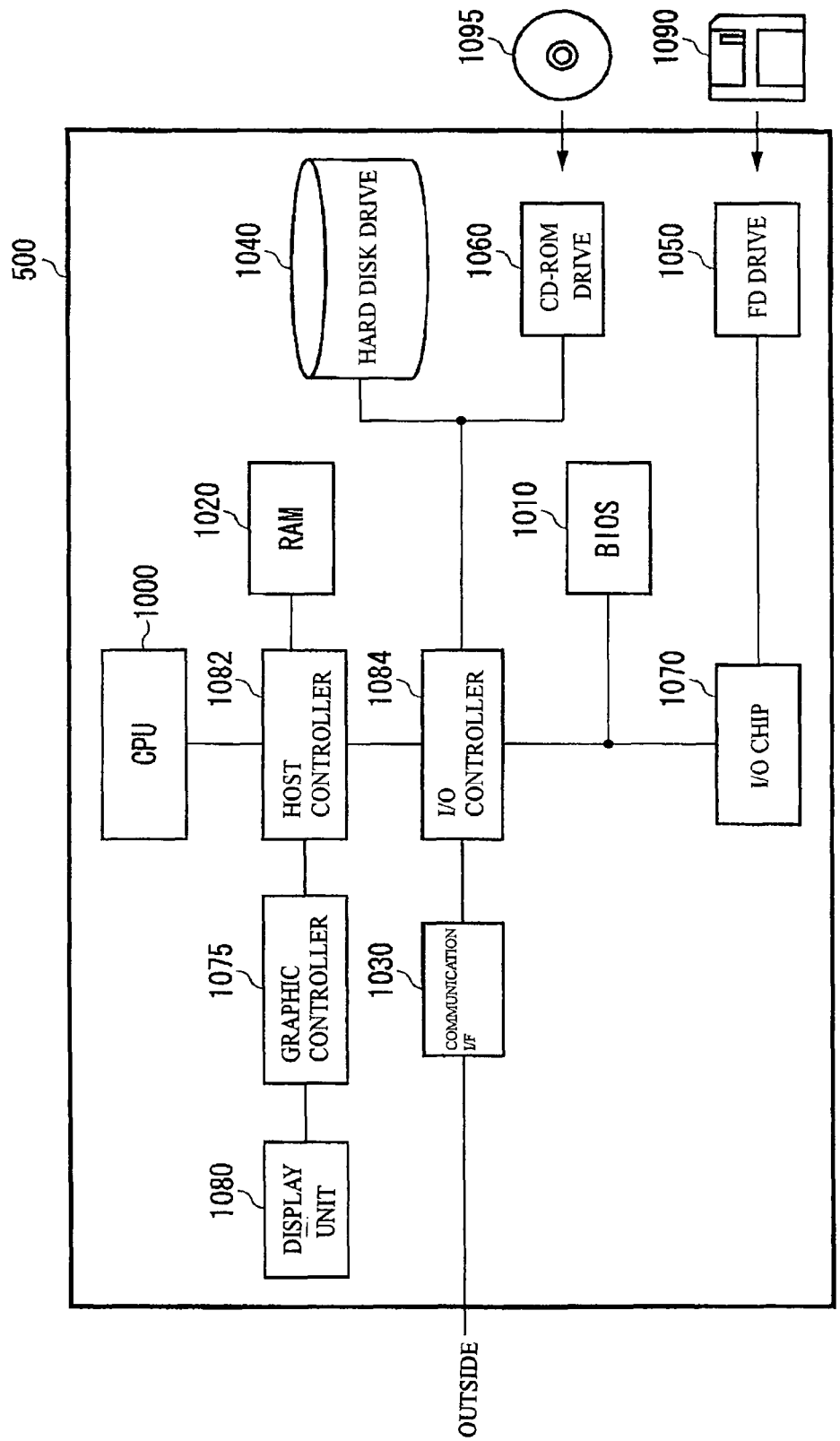
FIG. 12 shows an exemplary hardware configuration of a computer 500 working as the security policy generation device 30.

FIG. 12 shows an exemplary hardware configuration of a computer 500 working as the security policy generation device 30. The computer 500 includes: a CPU section having a CPU 1000, RAM 1020 and graphic controller 1075 connected to each other via a host controller 1082; an I/O section having a communication interface 1030 connected to the host controller 1082 via an I/O controller 1084, a hard disk drive 1040 and a CD-ROM drive 1060; and a legacy I/O section having a BIOS 1010 connected to the I/O controller 1084, a flexible disk drive 1050 and an I/O chip 1070.

The host controller 1082 connects the RAM 1020 to the CPU 1000 and graphic controller 1075 each accessing the RAM 1020 with high transfer rate. The CPU 1000 operates based on programs stored in the BIOS 1010 and RAM 1020, thus controlling each section. The graphic controller 1075 acquires the image data that the CPU 1000, etc. create on the frame buffer provided in the RAM 1020 and displays the image data on a display unit 1080. Alternatively, the graphic controller 1075 may include therein the frame buffer into which the image data created by CPU 1000, etc. is stored.

The I/O controller 1084 connects the host controller 1082 to the communication interface 1030, hard disk drive 1040 and CD-ROM drive 1060, each being a relatively high-speed I/O unit. The communication interface 1030 communicates with the outside apparatuses via a network. The hard disk drive 1040 stores the programs and data used by the computer 500. The CD-ROM drive 1060 reads programs or data from a CD-ROM 1095 and provides the programs or data for the I/O chip 1070 via the RAM 1020.

The BIOS 1010 and relatively low-speed I/O units, such as the flexible disk drive 1050 and I/O chip 1070 are also connected to the I/O controller 1084. The boot program executed by the CPU 1000 during the startup of the computer 500, the programs dependent on the hardware of the computer 500, and the like are stored in the BIOS 1010. The flexible disk drive 1050 reads programs or data from a flexible disk 1090 and provides the programs or data for the I/O chip 1070 via the RAM 1020. The I/O chip 1070 serves to connect the flexible disk 1090 and various I/O devices via, for example, a parallel port, serial port, keyboard, mouse port, etc.

The program provided for the computer 500, stored in recording media such as the flexible disk 1090, CD-ROM 1095 or an IC card, etc, is provided by the user. The program is read out from the I/O chip 1070 and/or I/O controller and installed into the computer 500 for execution. The operation of the program executed in the security policy generation device 30 by use of the computer 500, etc. is identical with that of the security policy generation device 30 described with reference to FIGS. 1 to 11, and hence an explanation thereof is omitted.

As shown in the embodiment, the user can define the messages transmitted or received in a distributed application by intuitively operating GUI, etc. According to the defined messages, the security policy generation device 30 can decide the transmitter, receiver, intermediary, etc. of each message. Consequently, a suitable value is assigned to the undecided parameter of the security pattern that is a model of security policy, whereby the security policy is automatically created. Accordingly, the user can be relieved of the operational load taken to create the security policy, and at the same time a suitable security policy can be created.

The previous description is of an advantageous embodiment for implementing the invention, and the technical scope of the invention should not be restrictively interpreted by the description of the embodiment. Those skilled in the art will recognize that many changes or modifications to the embodiment described above are possible within the scope of the invention. It will be apparent from the description of the claims that an embodiment with such changes or modifications applied thereto can also be included in the technical scope of the invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A security policy generation method for generating a security policy that decides at least one of an electronic signature to be appended to a message transmitted or received by a first information processing apparatus and an encryption method for encrypting the message transmitted or received by the first information processing apparatus, the security policy being set up for the first information processing apparatus, the security policy generation method comprising:
    storing, by a security pattern storage cart of a security policy generation device, a plurality of first security patterns,
        the plurality of first security patterns being models of the security policy,
        each of the plurality of first security patterns having an undecided first parameter, the undecided first parameter being replaceable to indicate a signer of at least one electronic signature appended to a first message or a decoder for decoding an encrypted message,
    the first security patterns including a presence attribute indicating a prohibition of the first information processing apparatus being indicated as a transmitter in the first message,
    the first security patterns including descriptive texts described in natural language indicating a threat or attack to guard against,
    at least one of the first security patterns including descriptive texts described in natural language describing a summary of the first security patterns, and
    at least one of the first security patterns including an interaction pattern indicating a transmitter type, a receiver type, and an intermediary type;
    defining a plurality of instances of the first message to be transmitted and received among a plurality of second information processing apparatuses during an operation of distributed application programs to be processed in association with the plurality of second information processing apparatuses;
    generating an application model having a transmitter and a receiver of the first message that is decided, for each of the plurality of instances of the first message, by the security policy generation device, wherein one of the plurality of instances of the first message includes a parameter type, wherein the parameter type defines information stored in a second parameter of one of the plurality of instances of the first message;
    selecting, by the security policy generation device, from the plurality of first security patterns, a second security pattern that is one of the models of security policy to be set up for the first information processing apparatus in association with each of the plurality of instances of the first message included in the application model, according to a instruction of the user and further based on the interaction pattern of at least one of the plurality of first security patterns, the selecting further including:
        filtering the plurality of first security patterns by excluding one or more first security patterns based on the interaction pattern of the one or more first security patterns as compared to characteristics of the first information processing apparatus,
        wherein the second security pattern includes a cipher type as the undecided first parameter, and
        wherein the first information processing apparatus is one of the transmitter of the message and the receiver of the message;
    generating the security policy by substituting identification information of the first information processing apparatus for the undecided first parameter of the second security pattern selected in association with the first message, wherein the first information processing apparatus is one of the transmitter of the first message and the receiver of the first message included in the application model; and
    further substituting a signature processing parameter in the first information processing apparatus for the undecided first parameter.

2. The security policy generation method according to claim 1, wherein
    storing one of the first security patterns that includes a presence attribute indicating that the presence of an intermediary in a message of a setting object or a presence inhibition attribute indicating a prohibition of the presence of the intermediary in the message of the setting object, and
    the security policy generation device selects a candidate of the first security patterns based upon the determination of whether or not there is the intermediary in the message of the setting object.

3. The security policy generation method according to claim 2, wherein
    the security pattern storage part stores a third security pattern for a transmitter, a fourth security pattern for a receiver and a fifth security pattern for an intermediary, which are models of security policies settable to a transmitter, a receiver and an intermediary of the first message, respectively; and
    the user inputs an instruction for specifying a message and an information processing apparatus for which a security policy is to be set up, and the security policy generation device selects a candidate of the second security pattern settable to the information processing apparatus, based upon which one of the transmitter, receiver and intermediary of a message, which are objects to be set the security policy, is the information processing apparatus, which is subject to be set the security policy; and the security policy generation device selects a sixth security pattern from security pattern candidates of selected in the candidate selection step, based upon the instruction by the user.

4. The security policy generation method according to claim 1, wherein the security pattern storage part stores as the second security pattern, a setting for the receiver of the first message that includes the receiver of the first message as the undecided parameter and indicates the reception of the first message where an electronic signature of the transmitter is appended and is permitted; and the security policy generation device substitutes, in response that the second security pattern is selected, the identification information of the receiver of the first message corresponding to the second security pattern for the undecided first parameter of the second security pattern regarding the receiver.

5. The security policy generation method according to claim 1, wherein the security pattern storage part stores as the second security pattern, the setting for the receiver of the first message that includes the receiver of the first message as the undecided first parameter and indicates the reception of the first message encrypted using a cipher that the receiver can decode is permitted; and the security policy generation device substitutes, in response that the second security pattern is selected, the identification information of the receiver of the first message corresponding to the second security pattern for the undecided first parameter of the security pattern regarding the receiver.

6. The security policy generation method according to claim 1, wherein the first message includes a plurality of first message parts;

the security policy generation device generates, for one of the first message parts, the application model having the transmitter and the receiver of the message part decided;

the security policy generation device selects the first security pattern that is a model of security policy to be set up for the transmitter or receiver of the message part, in association with each of the plurality of first message parts; and the security policy generation device generates the security policy by substituting the identification information of the transmitter or receiver of each of the first message parts for the undecided first parameter of the first security pattern selected in association with one of the first message parts.

7. The security policy generation method according to claim 1, further comprising:

storing an encryption processing third parameter used in a process of encryption or decoding by the first information processing apparatus or a signature processing fourth parameter used in a process of generating electronic signature or in a process of authenticating the electronic signature by the first information processing apparatus, each fourth parameter being specific in advance for each first information processing apparatus, wherein the security pattern storage part stores a third security pattern that includes, as an additional undecided fifth parameter, the encryption processing third parameter to be used in the process of encryption or decoding or the signature processing fourth parameter to be used in the process of generating the electronic signature to be appended to the first message of in the process of authenticating the electronic signature, and the security policy generation device further substitutes the encryption processing third parameter or the signature processing fourth parameter in the information processing apparatus of security policy setting object, or information inputted by the user, for the undecided fifth parameter of the second security pattern.

8. A security policy generation method for generating a security policy that decides at least one electronic signature to be appended to a message transmitted or received by an information processing apparatus and an encryption method for encrypting the message transmitted or received by the information processing apparatus, the security policy being set up for the information processing apparatus, a step of generating the security policy comprising:

defining an interface of services provided by a server for a terminal or another server, including adding a namespace for defining tags used in the interface;

generating an application model having a transmitter and a receiver of a first message decided, for each of a plurality of instances of the first message that are communicated using a distributed application program, according to an instruction of a user;

storing in advance a plurality of first security patterns, the plurality of first security patterns being models of a first security policy, one or more of the plurality of first security patterns having an undecided parameter that has not been predetermined, the undecided parameter being replaceable to indicate a signer of electronic signature appended to the first message or a decoder for decoding an encrypted first message, wherein the models of the first security policy are divided into segments including segments for the undecided parameter and a segment for a decided parameter;

selecting a first selected security pattern from the plurality of first security patterns, the first selected security pattern being a model of the first security policy to be set up for the transmitter or receiver or intermediary of the first message, in association with each of the plurality of instances of the first message included in the application model, according to the instruction of the user, wherein the undecided parameter of the first selected security pattern is sequentially decided according to the application model and a platform model, and wherein the first selected security pattern holds a fragment of a part of the first security policy that holds the undecided parameter;

generating the first security policy by substituting an identification information of the transmitter or receiver of each first message included in the application model for the undecided parameter of the first selected security pattern selected in association with the first message;

selecting an information processing apparatus for a first security policy setting object by user input;

storing a second security pattern for the transmitter, a third security pattern for the receiver and a fourth security pattern for the intermediary, each being a model of the first security policy settable in each of the transmitter, receiver and intermediary of the first message;

selecting candidates of the plurality of first security patterns settable in the information processing apparatus based upon a determination of whether the information processing apparatus of the first security policy setting object is any one of the transmitter, the receiver and the intermediary of the message of the first security policy setting object, so that the candidates of the plurality of first security patterns have an interaction pattern that corresponds with the information processing apparatus, the interaction pattern indicating whether the candidates of the plurality of first security patterns are a security pattern for the transmitter, the receiver, or the intermediary, wherein the interaction pattern indicates a transmitter type, a receiver type, and an intermediary type;

selecting the first selected security pattern from among the candidates of the plurality of first security patterns selected by the candidate selection step, according to the instruction of the user, with the first selected security pattern including a natural language text description of an attack or threat to be guarded against using the security policy;

storing, in the first message of the security policy setting object, the first selected security pattern that includes a presence attribute indicating the presence of the intermediary in the message of the security policy setting object or a presence inhibition attribute indicating the prohibition of the presence of the intermediary; and selecting the candidates of the plurality of security patterns based upon the determination of whether there exists the intermediary in the message of the security policy setting object.

* * * * *